US012793509B2

United States Patent
Kendall et al.

(10) Patent No.: US 12,793,509 B2
(45) Date of Patent: Nov. 10, 2026

(54) GAMING OPERATIONS AND GAMING DEVICE FOR TRACKING MULTIPLE AND PERSISTENT AWARD CATEGORIES DURING GAME INSTANCES

(71) Applicant: Aristocrat Technologies Australia Pty Limited, North Ryde (AU)

(72) Inventors: Karen Kendall, Toongabbie (AU); Lipi Gupta, Newington (AU); Eric Lie, Winston Hills (AU); Geoffrey Richardson, Baulkham Hills (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 300 days.

(21) Appl. No.: 18/419,403

(22) Filed: Jan. 22, 2024

(65) Prior Publication Data

US 2025/0111750 A1 Apr. 3, 2025

(30) Foreign Application Priority Data

Sep. 28, 2023 (AU) ................................ 2023237143

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ............. G07F 17/3213; G07F 17/3244; G07F 17/3258; G07F 17/3267; G07F 17/34
See application file for complete search history.

(56) References Cited

U.S. PATENT DOCUMENTS 10,147,264 B1 * 12/2018 Halvorson .......... G07F 17/3216
2006/0116208 A1 * 6/2006 Chen ....................... G06F 9/545
463/43

* cited by examiner

*Primary Examiner* — Jasson H Yoo
(74) *Attorney, Agent, or Firm* — Armstrong Teasdale LLP

(57) ABSTRACT

A gaming device is programed to, based upon symbols displayed in a plurality of symbol positions for at least a first category of awards and a second category of awards, (i) add any first and second category awards to a first category total and a second category total, respectively; (ii) add a number of one or more first and second category symbols displayed to a first category symbol total and a second category symbol total, respectively; (iii) cause display of the number of the one or more first category symbols associated with the first category total, and the number of the one or more second category symbols associated with the second category total; and (iv) upon conclusion of feature game instances, output an award based on the first category total and the second category total modified based on the first category symbol total and the second category symbol total, respectively.

19 Claims, 21 Drawing Sheets

300A

| | 341A<br>Reel Strip 1 | 342A<br>Reel Strip 2 | 343A<br>Reel Strip 3 | 344A<br>Reel Strip 4 | 345A<br>Reel Strip 5 |
|---|---|---|---|---|---|
| 301A | A | 10 | Q | 10 | PIC1 |
| 302A | PIC3 | J | K | PIC2 | SCAT |
| 303A | PIC3 | Q | 9 | PIC3 | PIC3 |
| 304A | PIC2 | PIC4 | PIC2 | 9 | Q |
| 305A | K | A | PIC1 | Q | A |
| 306A | SCAT | SCAT | 10 | A | Q |
| 307A | PIC3 | PIC1 | K | A | Q |
| 308A | A | J | WILD | 10 | WILD |
| 309A | J | Q | J | PIC2 | K |
| 310A | 10 | K | PIC3 | K | 9 |
| 311A | A | 9 | Q | PIC1 | PIC4 |
| 312A | PIC3 | K | PIC3 | SCAT | 10 |
| 313A | 10 | 10 | SCAT | A | 10 |
| 314A | SCAT | SCAT | Q | J | Q |
| 315A | K | WILD | Q | 10 | A |
| 316A | PIC1 | J | 10 | A | 10 |
| 317A | J | J | A | PIC4 | K |
| 318A | Q | A | SCAT | 9 | A |
| 319A | PIC4 | PIC2 | PIC2 | 9 | J |
| 320A | A | PIC3 | Q | PIC2 | PIC3 |
| 321A | PIC1 | 9 | A | PIC1 | PIC4 |
| 322A | A | PIC3 | J | WILD | 10 |
| 323A | J | K | J | PIC3 | J |
| 324A | Q | Q | PIC4 | Q | Q |
| 325A | PIC2 | Q | 9 | A | PIC3 |
| 330A | ... | ... | ... | ... | ... |

FIG. 3A

300B

| | Reel Strip 1 (341B) | Reel Strip 2 (342B) | Reel Strip 3 (343B) | Reel Strip 4 (344B) | Reel Strip 5 (345B) |
|---|---|---|---|---|---|
| 301B | A | 10 | NIGHT COR | DAY COR | PIC1 |
| 302B | DAY COR | J | NIGHT COR | PIC2 | SCAT |
| 303B | PIC3 | Q | 9 | PIC3 | DAY COR |
| 304B | PIC2 | Q | PIC2 | 9 | Q |
| 305B | K | A | PIC1 | Q | A |
| 306B | SCAT | NIGHT COR | 10 | A | DAY COR |
| 307B | NIGHT COR | PIC1 | K | A | Q |
| 308B | A | J | WILD | 10 | WILD |
| 309B | J | Q | J | NIGHT COR | K |
| 310B | NIGHT COR | DAY COR | DAY COR | K | 9 |
| 311B | A | 9 | Q | PIC1 | SCAT |
| 312B | PIC3 | K | PIC3 | SCAT | 10 |
| 313B | 10 | 10 | | A | NIGHT COR |
| 314B | 9 | SCAT | Q | J | Q |
| 315B | K | WILD | Q | NIGHT COR | A |
| 316B | PIC1 | J | 10 | A | DAY COR |
| 317B | J | NIGHT COR | A | PIC3 | K |
| 318B | Q | A | A | 9 | A |
| 319B | DAY COR | PIC2 | NIGHT COR | 9 | J |
| 320B | A | PIC3 | Q | PIC2 | NIGHT COR |
| 321B | PIC1 | 9 | A | PIC1 | PIC2 |
| 322B | A | DAY COR | DAY COR | WILD | 10 |
| 323B | J | SCAT | NIGHT COR | DAY COR | J |
| 324B | DAY COR | NIGHT COR | SCAT | Q | Q |
| 325B | PIC2 | Q | 9 | A | PIC3 |
| 330B | ... | ... | ... | ... | ... |

FIG. 3B

FIG. 8
800
SUPER
MOUSE
GRAND
GRAND JACKPOT
$25,000.19
840
8 FREE GAMES
WON!
COLLECT , COR AND LINE WINS
Left
to
Right
Right
to
Left
8925
CREDIT
125
WIN
25
BET
5¢
860

FIG. 13
SUPER
MOUSE
GRAND
GRAND JACKPOT
$25,000.19
LINE WINS
265
COR WINS
95
Left
to
Right
Right
to
Left
12 EXTRA
FREE GAMES!
8925
CREDIT
235
WIN
25
BET
5¢
1360

GAMING OPERATIONS AND GAMING DEVICE FOR TRACKING MULTIPLE AND PERSISTENT AWARD CATEGORIES DURING GAME INSTANCES

CROSS-REFERENCE TO RELATED APPLICATIONS

This application claims priority to Australian Patent Application Serial No. 2023237143, filed Sep. 28, 2023, the entire contents and disclosure of which are hereby incorporated herein by reference in its entirety.

TECHNICAL FIELD

The present application relates to a gaming device, a method of operating a gaming device and a system that evaluates and tracks multiple and persistent categories of awards during game instances and combines those awards for a final output.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

An example embodiment describes a gaming device including at least one processor, and at least one memory storing reel data defining a plurality of reel strips and instructions. When the instructions are executed by the at least one processor, they cause the at least one processor to (i) cause display of symbols in a plurality of columns of symbol positions, wherein the displayed symbols are selected from a portion of the plurality of reel strips and include value symbols; (ii) based upon the symbols selected for display in the plurality of columns of symbol positions, for at least a first category of awards and a second category of awards: (a) add any first category awards to a first category total in the memory, and any second category awards to a second category total in the memory; (b) upon the displayed symbols including one or more first category symbols, add a number of the one or more first category symbols to a first category symbol total in the memory; (c) upon the displayed symbols including one or more second category symbols, add a number of the one or more second category symbols to a second category symbol total in the memory; and (d) cause display of the number of the one or more first category symbols associated with the first category total, and the number of the one or more second category symbols associated with the second category total; and (iii) upon conclusion of all feature game instances, output an award based on (a) the first category total modified based on the first category symbol total, and (b) the second category total modified based on the second category symbol total.

Another example embodiment describes a computer-implemented method of operating a gaming device. The computer-implemented method includes (i) causing display of symbols in a plurality of columns of symbol positions, wherein the displayed symbols are selected from a portion of a plurality of reel strips and include value symbols; (ii) based upon the symbols selected for display in the plurality of columns of symbol positions, for at least a first category of awards and a second category of awards: (a) adding any first category awards to a first category total in the memory, and any second category awards to a second category total in the memory; (b) upon the displayed symbols including one or more first category symbols, adding a number of the one or more first category symbols to a first category symbol total in the memory; (c) upon the displayed symbols including one or more second category symbols, adding a number of the one or more second category symbols to a second category symbol total in the memory; and (d) causing display of the number of the one or more first category symbols associated with the first category total, and the number of the one or more second category symbols associated with the second category total; and (iii) upon conclusion of all feature game instances, outputting an award based on (a) the first category total modified based on the first category symbol total, and (b) the second category total modified based on the second category symbol total.

Another example embodiment describes a system including one or more processors, and one or more memory storing reel data defining a plurality of reel strips and instructions. The instructions, when executed by the one or more processors, cause the one or more processors to (i) cause display of symbols in a plurality of columns of symbol positions during a current feature game instance, wherein the displayed symbols are selected from a portion of a plurality of reel strips and include value symbols; and (ii) based upon the symbols selected for display in the plurality of columns of symbol positions during the current feature game instance, for at least a first category of awards and a second category of awards: (a) add any first category awards to a first category total in the memory, and any second category awards to a second category total in the memory; (b) upon the displayed symbols including one or more first category symbols, add a number of the one or more first category symbols to a first category symbol total in the memory; (c) upon the displayed symbols including one or more second category symbols, add a number of the one or more second category symbols to a second category symbol total in the memory; and (d) update display of the number of the one or more first category symbols associated with the first category total, and the number of the one or more second category symbols associated with the second category total for a next feature game instance.

BRIEF DESCRIPTION OF THE DRAWINGS

FIGS. 3A and 3B illustrate example reel strip layouts.

DETAILED DESCRIPTION

Figure 1:
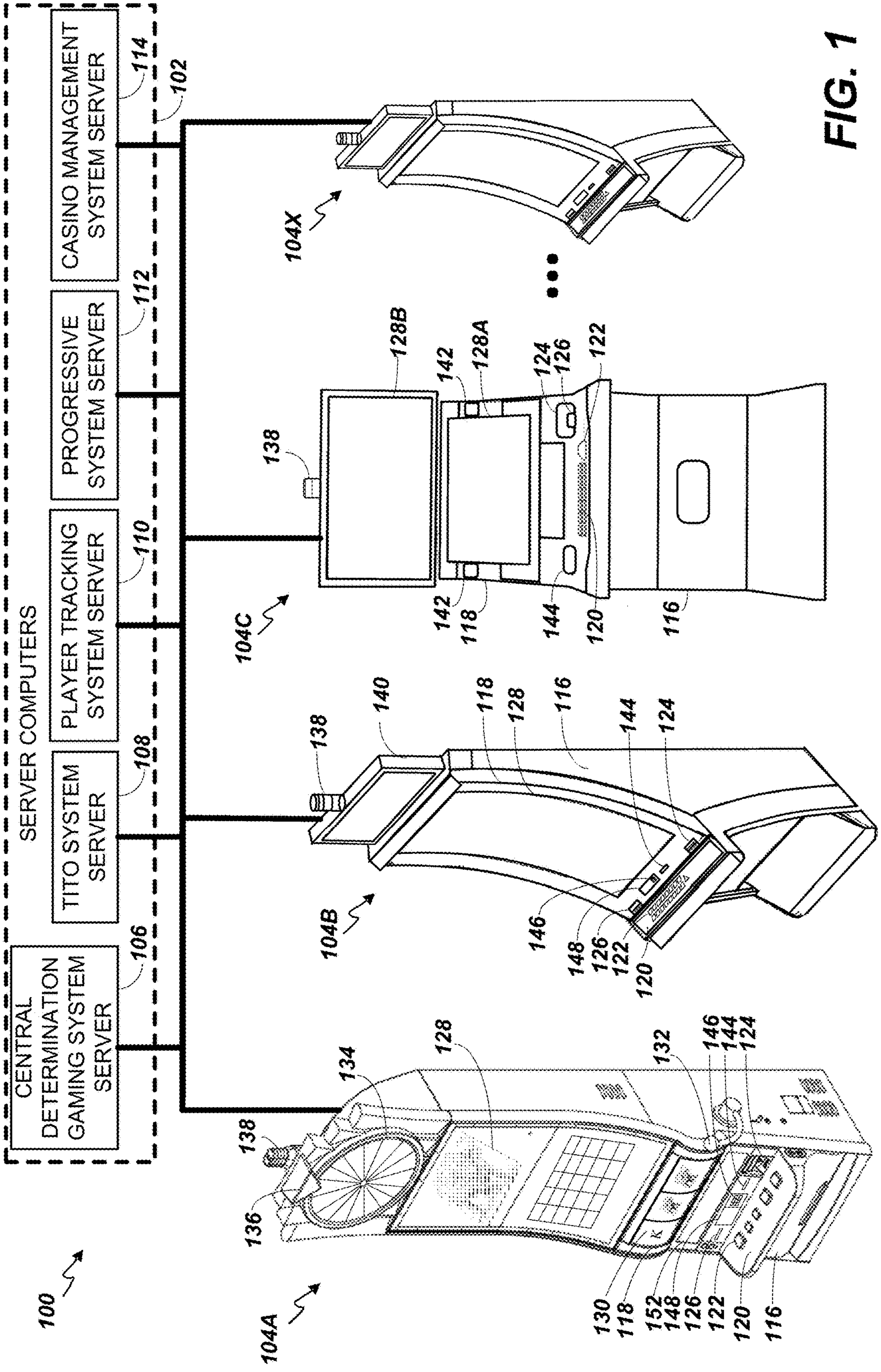
FIG. 1 is an exemplary diagram showing several EGMs networked with various gaming related servers.

In an example embodiment, an EGM is provided where during a feature game, separate persistent award totals are maintained (e.g., on meters in memory) for a first category of awards and a second category of awards made over a plurality of free games. Additionally, or alternatively, persistent award totals are also maintained for first and second repeat win symbols. At the end of the free games, when a trigger is satisfied, an award is made that includes a number of repeat wins of the persistent award total of the first category of awards based on the number of first repeat win symbols and a number of repeat wins of the persistent award total of the second category of awards based on the number of second repeat win symbols.

The embodiments of the present disclosure represent a technical improvement in the art of electronic gaming devices, machines, systems, and operations of such electronic gaming devices or systems. Technical improvements represented by the present disclosure include at least using an RNG to randomly determine symbols for displaying in each symbol position during a game instance and evaluating for one or more winning combinations to award a player, and for triggering a feature game of free game instances. During a free game instance, the player may win in multiple different categories (e.g., a cash-on-reel (COR) win category and a line win category) and the player's winnings in the multiple different categories are stored in memory so that they are persistent through the game play, displaying those award values on meters associated with each category of the multiple different categories such that the player is able to easily see the current status of award value for each category. Further, a position and an award symbol are randomly determined using a random number generator (RNG), and as the player has a particular winning combination in each different category, the award value for each category as displayed in its respective meter is updated.

Randomizing the position at which award symbols for each different award category are displayed, and a number of award symbol displayed for each different category that specifies a multiplier value, may allow a smaller set of payline pathways to be stored within memory. Pathways or paylines may include a plurality of spinning reel game instances that designate award symbols and in which columns they are displayed. Such an implementation may reduce memory requirements. The feature may further increase the degree of randomness in a displayed output. Another feature includes setting a relevant award total based on a combination of awards in different categories (e.g., the COR win category and the line win category) to be awarded at the conclusion of free game instances, rather than awarding the award total immediately. This feature enables any awarded award total to be incremented further during the balance of the feature games upon further COR and/or line win symbols being displayed in a relevant column. In this manner, the improvement allows for a potentially larger award total to be awarded at the conclusion of the free games.

The technical problems addressed herein include at least one of: (i) inability of known systems to persistently track and display award values for different categories of awards; (ii) inability to randomly assign award values for each different category at the start of game play to facilitate controlling RTP while improving variability in game play; (iii) inability of known systems to efficiently communicate persistent award values associated with each different category during game play; and (iv) inability of known systems to improve an amount of data storage and use of computation resources by designating and updating award value for each different category until the feature game is concluded.

The resulting technical effects and/or technical benefits achieved by this disclosure include at least one of: (i) ability to persistently track and display award values for different categories; (ii) ability to randomly assign award values for each different category at the start of game play to facilitate controlling of RTP while improving variability in game play; (iii) ability to efficiently communicate persistent award values associated with each different category during game play; (v) ability to improve an amount of data storage and use of computation resources by designating and updating award value for each different category until the feature game is concluded; (vi) displaying large quantities of complex information in a relatively small display area; (v) communicating complex information with easy-to-understand animations on a display; (vi) clearly indicating when a player has entered a bonus game; (vii) efficiently communicating different game rules for the bonus game on the display during game play; and (viii) providing versatility as to which devices (e.g., EGMs, mobile devices, etc.) the games described herein may be played on because of the efficient display area designs described herein.

Various interface improvements are provided herein to efficiently and effectively communicate information. For instance, while advancement toward and during play of a number of free games, as described herein, various animations are provided to communicate incrementation of award win symbols, accumulation of award value, and a status of the advancement toward the number of free games (e.g., a number of spins remaining in the hold and spin game before the free games are provided).

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 including a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reels.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
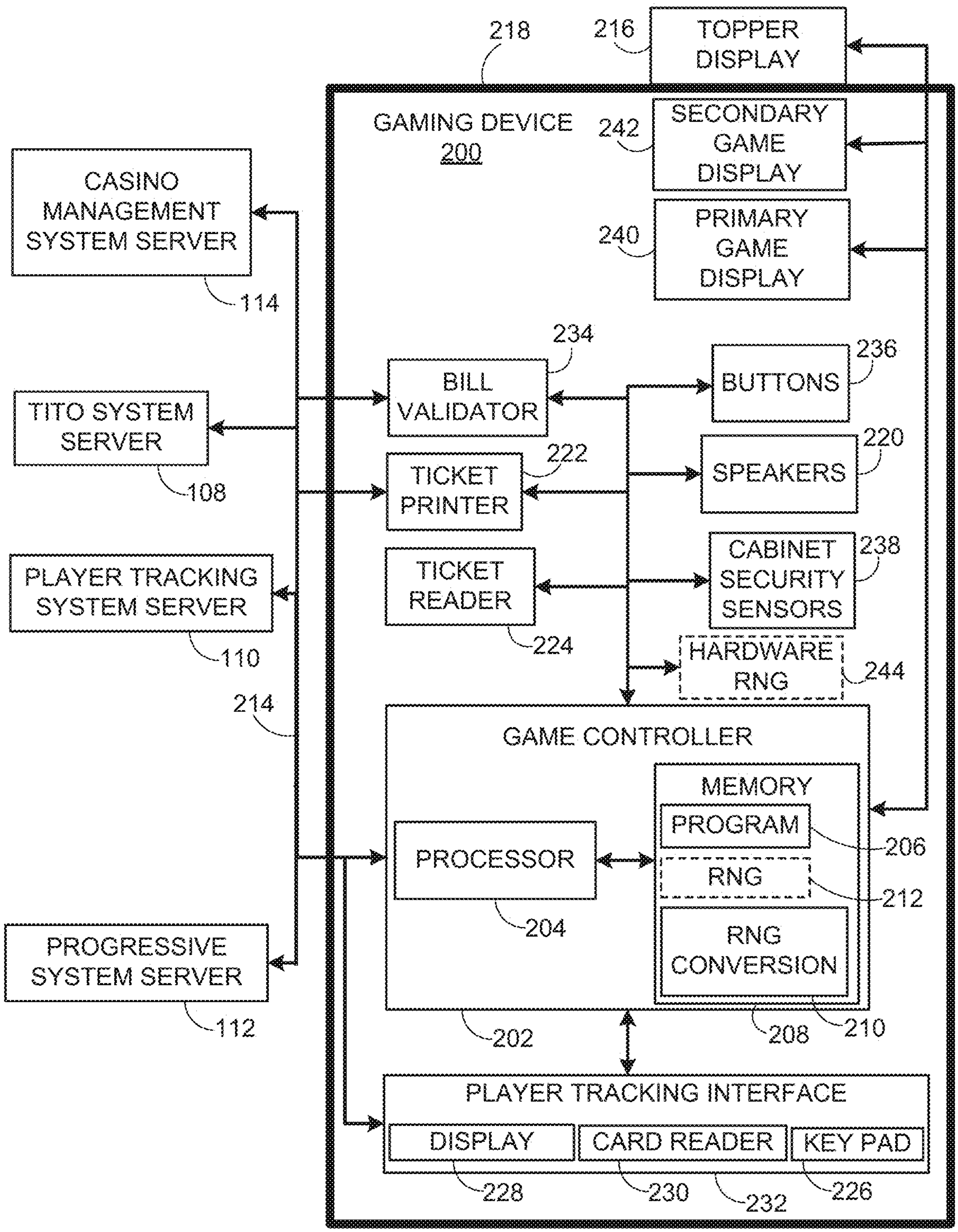
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot awards available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play, or any other information or media desired by the game designer or operator.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (e.g., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and award information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
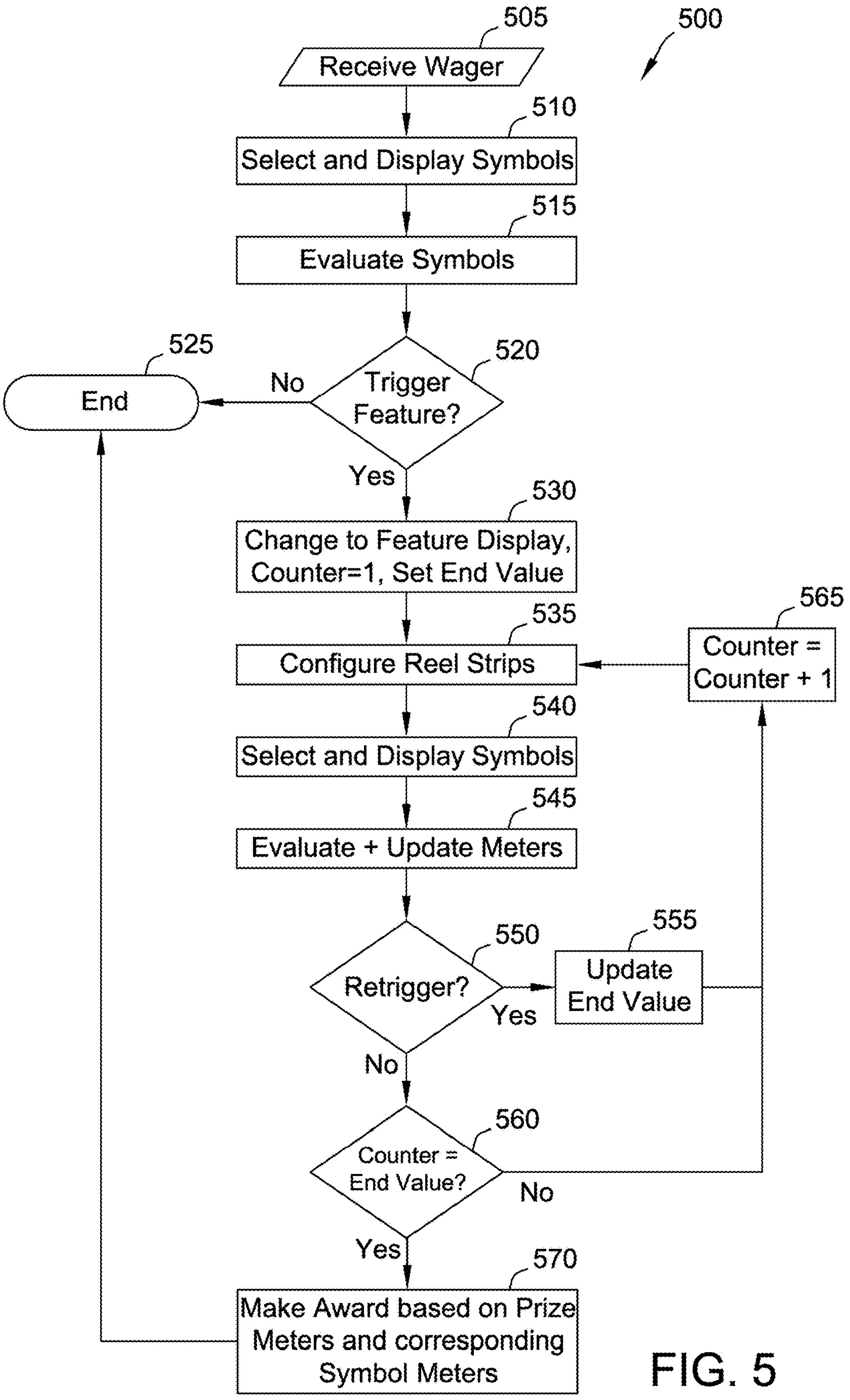
FIG. 5 is a flow chart of a method of operating a gaming device.

FIG. 5 is a flow chart of an example embodiment of a method 500 of operating a gaming device 200. The example method 500 broadly involves conducting a base game in response to receipt of a wager by selecting symbols from reel strips, evaluating the selected symbols, and conducting a feature game if one is triggered.

In this respect, FIG. 3A illustrates an example of a set 300A of five reel strips 341A, 342A, 343A, 344A, 345A for a base game. In the example, for illustrative purposes, twenty-five reel strip positions 301A-325A are shown for each reel strip 341A-345A. Each reel strip position of each reel has a symbol. For example, a "PIC1" symbol occupies the twenty-first reel strip position 321A of the fourth reel 344A. The symbols shown on the reel strip are generally indicative of symbols that may be employed in the embodiments, however, other reels strips to those illustrated in FIG. 3A can be used, for example, reel strips where two or more wild symbols are placed at consecutive reel strip positions of a reel strip. Symbol position 330A indicates that the reel strips 341A-345A may have more symbols than illustrated. For example, the reel strips 341A-345A could have between 30 and 100 reel strip positions with the last reel strip position of a respective reel strip being treated as contiguous with the first reel strip position 301A as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the award value is, the longer the reel strip needs to be to lower the hit rate to maintain the target RTP). In some examples, the reel strips associated with different columns may be of different lengths to one another.

Figure 7:
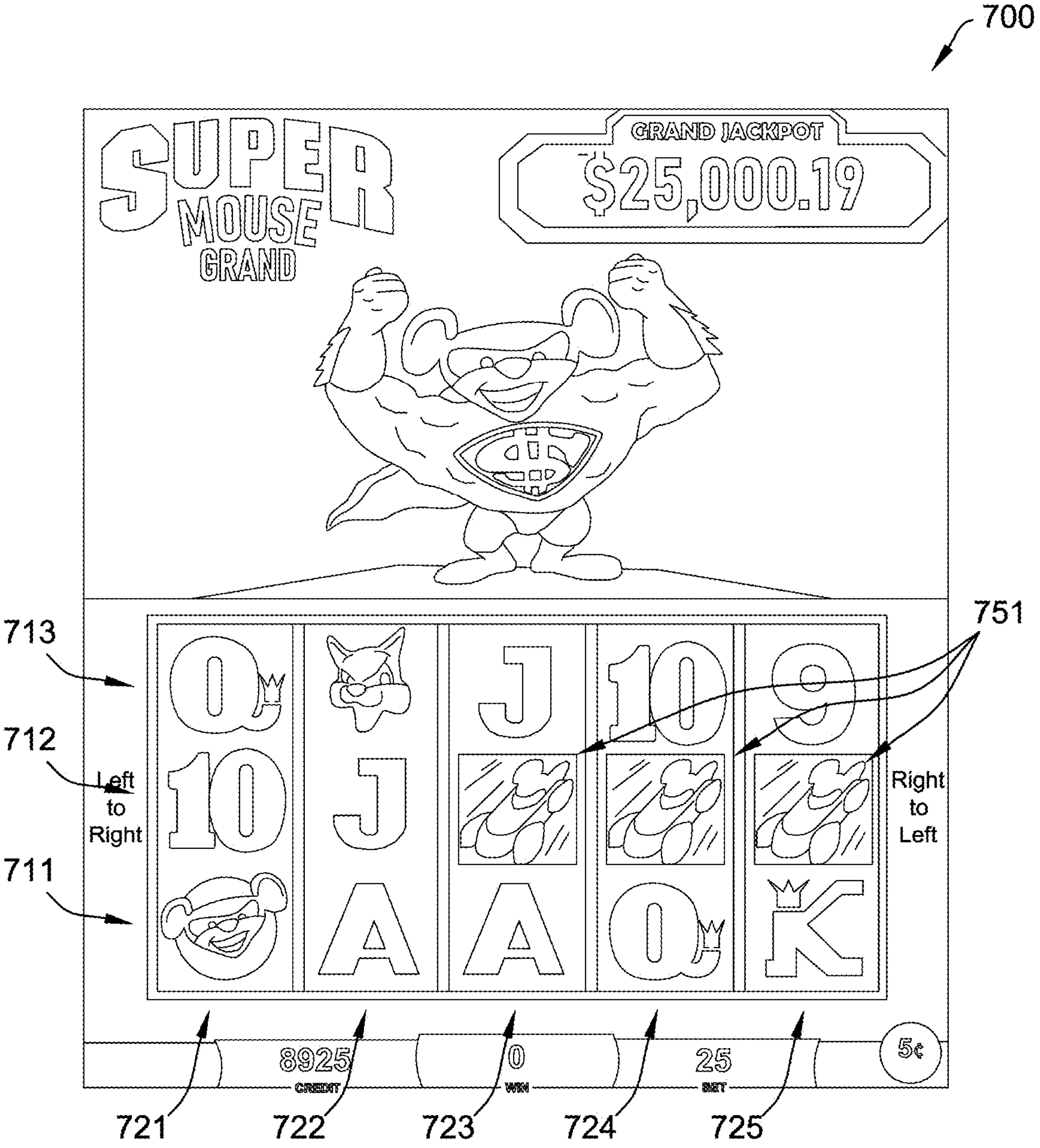
FIGS. 7 to 20 are example screen displays of an example game including the functionality described herein.

At step 510, processor 204 selects symbols for a spinning reel game and controls the display 240 to display the selected symbols. FIG. 7 shows an example screen display 700 of a base game where symbols are selected from five reel strips for display in five columns of symbol positions 721-725 with three symbols being selected from each reel strip such that there are also three rows 711-713 of symbol positions.

Figure 4:
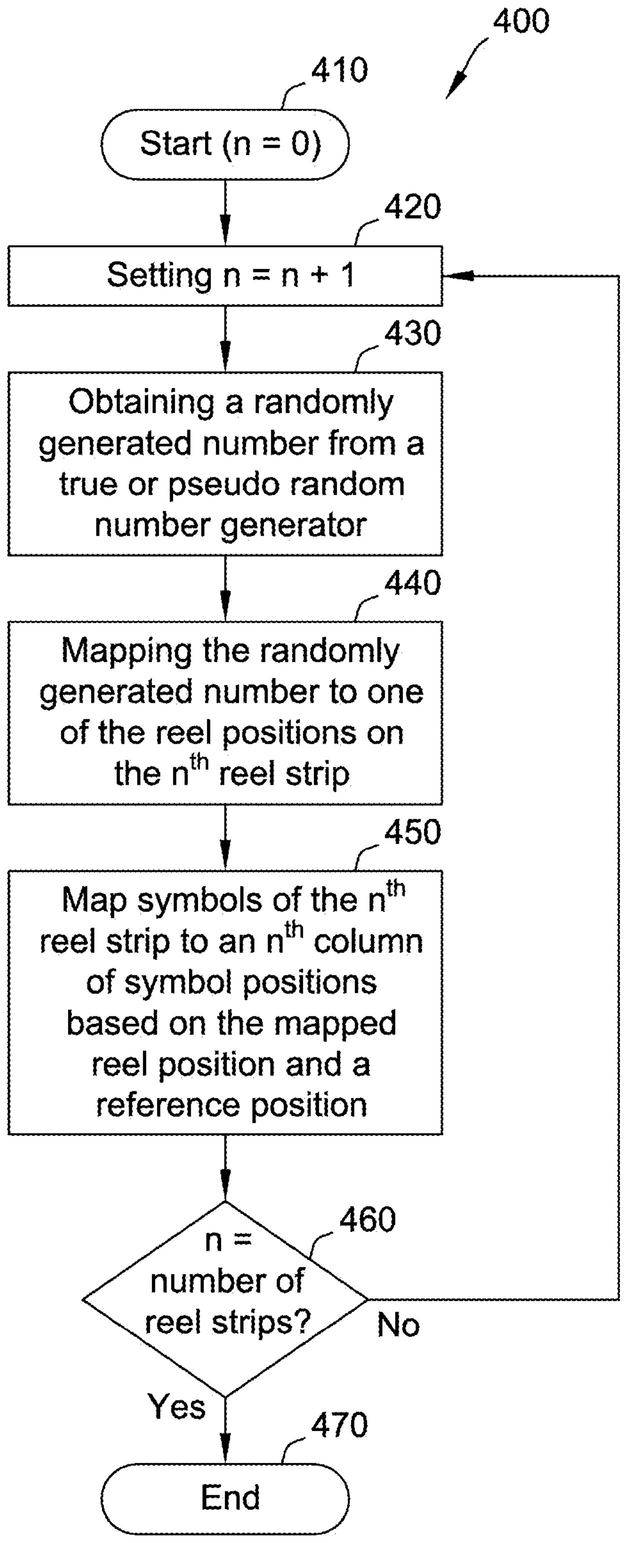
FIG. 4 is a flow chart of a symbol selection method.

FIG. 4 is a flow chart of an example method 400 carried out by processor 204 to select symbols from reel strips at step 510. At step 410, processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. That is, the symbol positions in bottom row 811. In this example, the selected reel position (and hence the symbol at this position) is mapped to the bottom symbol position of the column. Referring to the example reel strips of FIG. 3A, if the value returned by the RNG 212 is mapped to reel position 313A when three symbols are being selected from each reel strip, then for the first reel strip 341A, "10" is mapped to a first, bottom symbol position, "PIC3" symbol is mapped to a second symbol position, and "A" symbol is mapped to a third symbol position, top symbol position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. In other example, different numbers of symbols may be mapped to different numbers of symbol positions.

After the symbols of all reel strips have been mapped to symbol position, the processor 204 controls display 240 to display them at the symbol positions as shown for example in FIG. 7.

After the symbols are selected, processor 204 evaluates the selected symbols at step 515 for one or more winning combinations based on a pay table stored in memory 208. In this example, processor 204 applies a win line based evaluation by processing the selected symbols to identify instances of the same symbol appearing on defined sets of symbol positions (lines), comprising one symbol from each column. In this example, the processor 204 evaluates for winning combinations from left to right and right to left. Upon there being one or more winning combinations, processor 204 makes an award for each winning combination based on any selected bet multiplier, for example, by adding credit amounts defined by the pay table to a meter such as a win or credit meter in memory 208.

At step 520, processor 204 determines whether to trigger an award of a plurality of free game instances. In an example, the trigger condition is that the selected symbols include three or more SCAT symbols on a win line. In the example of FIG. 7, processor 204 there are three SCAT symbols 751 (here having the visual characteristics of a car) when a win line is evaluated right to left, resulting in processor 204 making a positive determination at step 520. It will also be observed that an award of 125 credits has been made by processor 204 in the triggering base game and added to win meter 860.

Figure 8:

When processor 204 makes a positive determination at step 520, processor 204 controls the display 240 to show a feature award message 840 such shown in the example screen display 800 of FIG. 8. In this example, award message 840 states “8 Free Games Won! Collect [PIC1 symbols], COR and Line Wins” indicating the number of free games won, and the game mechanic of the free games as explained in further detail below.

Then, at step 530, processor 204 controls the display 240 to change to a feature game display, as shown in example screen display 900 in which Line Wins meter 763 and COR Wins meter 761 are added above the symbol positions.

Also at step 530, processor 204 sets a free game counter to one in memory 208 and sets a current end value for the free games based on the feature trigger. In this respect, in this example eight free game instances are awarded for three SCAT symbols, twelve free game instances are awarded for four SCAT symbols, and fifteen free game instances are awarded for five SCAT symbols. Accordingly, based on three SCAT symbols in FIG. 7 processor 204 will set the end value to eight. As will be apparent from the following description, processor 204 conducts free game instances an end condition is met which in this example is that the free game counter equals the end value as initially set or subsequently modified.

At step 535 processor 204 configures the reel strips for a current free game instance. In this respect, FIG. 3B illustrates example reel strips for use in the free games. The reel strips have a plurality of cash on reel “COR” symbols, in this example DAY COR symbols (e.g., second reel position 302B of first reel strip 341B) and NIGHT COR symbols (e.g., first and second reel positions 301B, 302B of third reel strip 343B). In this example, DAY COR symbols have visual characteristics of the Earth during the day, and NIGHT COR symbols visual characteristics of the Earth during the night. The COR symbols can be understood as award symbols as each COR symbol has an award value, in this example, a value in credits. In this example, the award value is assigned dynamically by processor 204 in each free game instance at step 535 by independently determining award value for each COR symbol using RNG 212 and a weight table in memory 208. In some examples, the award values may depend on a wager amount or a bet multiplier. In some examples, the COR award value may be preset or be determined once for the entirety of the free games.

At step 540, processor 204 selects symbols from the configured reel strips using the process 400 described in relation to FIG. 4 above and controls display 240 to display the reels spinning to a stop at the selected positions.

Figure 6:
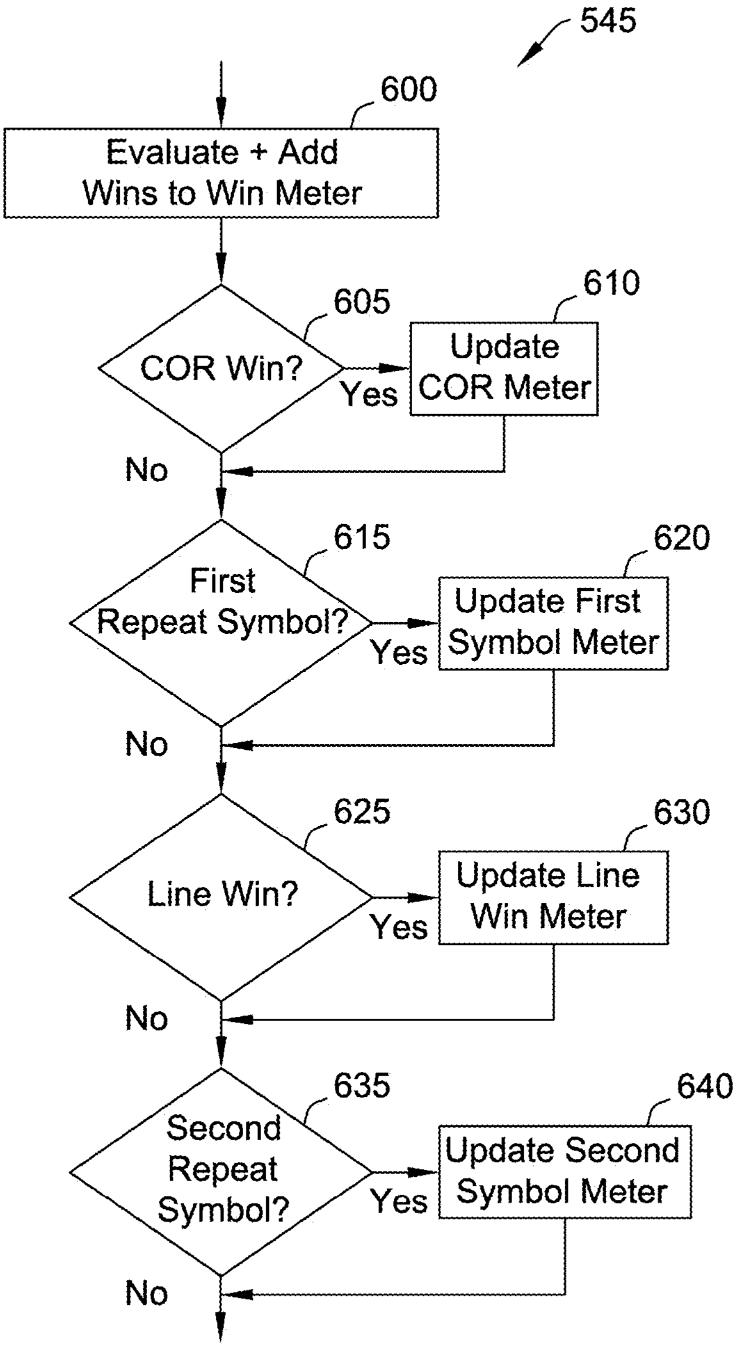
FIG. 6 is a flow chart showing detail of FIG. 5.

At step 545 processor 204 evaluates the selected symbols for winning combinations and, as necessary, updates a number of meters in memory in order to maintain totals of different categories of award and different symbols. This process 545 is shown in more detail in FIG. 6. It will be appreciated that these steps do not necessarily need to be carried out in the order shown in FIG. 6 and that the visual changes to the values of these meters shown on display 240 can be made at different times.

Figure 9:
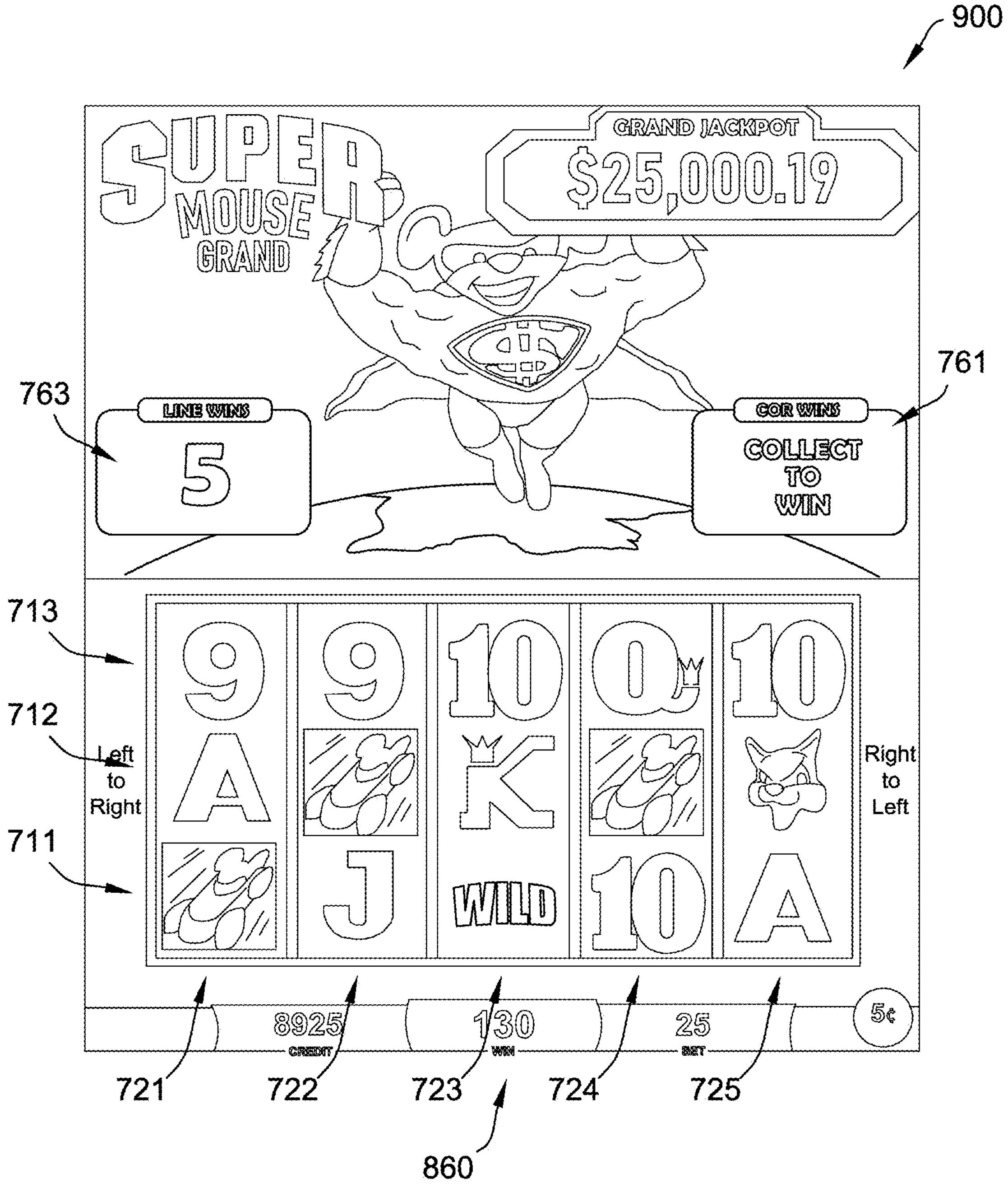

At step 600, processor 204 evaluates the selected symbols. In the free games, the evaluation includes separate line win and COR symbol evaluations, which is evaluations for first and second categories of awards. Advantageously, these categories are different to one another, particularly because award from the COR symbols are visually observable from the selected symbols. In this example, the line win evaluations are the same as in the base game, which are based on a pay table with the win lines evaluated both from left to right and right to left. In the example, of FIG. 9, processor 204 has evaluated a line win of 5 credits and added it to win meter 860, which now has a value of 130 credits. The COR evaluation involves processor 204 awarding the total award value shown when two or more COR symbols are selected on a win line (left to right or right to left). In the example of FIG. 9, no COR symbols have been selected so processor 204 makes no COR awards.

At step 605, processor 204 determines whether there was COR win and, upon making a positive determination, at step 610, updates a COR win meter in memory and a visual display of the COR meter 761. In this example, processor 204 will make a negative determination at step 605 and proceed to step 615.

At step 615, processor 204 determines whether the selected symbols included a first repeat symbol. In this example, the first repeat symbol is a NIGHT COR symbol. Accordingly, processor 204 will make a negative determination at step 615 and proceed to step 625.

At step 625, processor 204 determines whether there was line win and if so, updates line win meter in memory 208 and the visual display of the win line meter 763 at step 630. In this example, processor 204 will make a positive determination at step 625 and updates the total in the memory 208 and the visual display of the line win meter 763 to the value of 5 credits as shown in FIG. 9 before proceeding to step 635.

At step 635, processor 204 determines whether the selected symbols included a second repeat symbol. In this example, the second repeat symbol is a PIC1 symbol that has the visual characteristics of the “SUPER MOUSE” character. Accordingly, in the case of FIG. 9, processor 204 will make a negative determination at step 615. The process 500 then continues at step 550.

At step 550, processor 204 determines whether the selected symbols include enough SCAT symbols to satisfy an end value increment condition (or "retrigger"). In this example eight further free game instances are awarded for three SCAT symbols, twelve free game instances are awarded for four SCAT symbols, and fifteen free game instances are awarded for five SCAT symbols. There are insufficient SCAT symbols on a win line in FIG. 9 to satisfy the increment condition and hence processor 204 will make a negative determination at step 550.

At step 560, processor 204 determines whether the counter equals the current end value. In this example, with the end value initially set to eight, in the first iteration processor 204 will make a negative determination at step 560 and proceed to step 565 and increment the counter by one before beginning a further iteration at step 535.

FIGS. 10 to 17 are screen displays 1000-1800 resulting from further iterations, that further illustrate process 500 implemented by processor 204.

Figure 10:
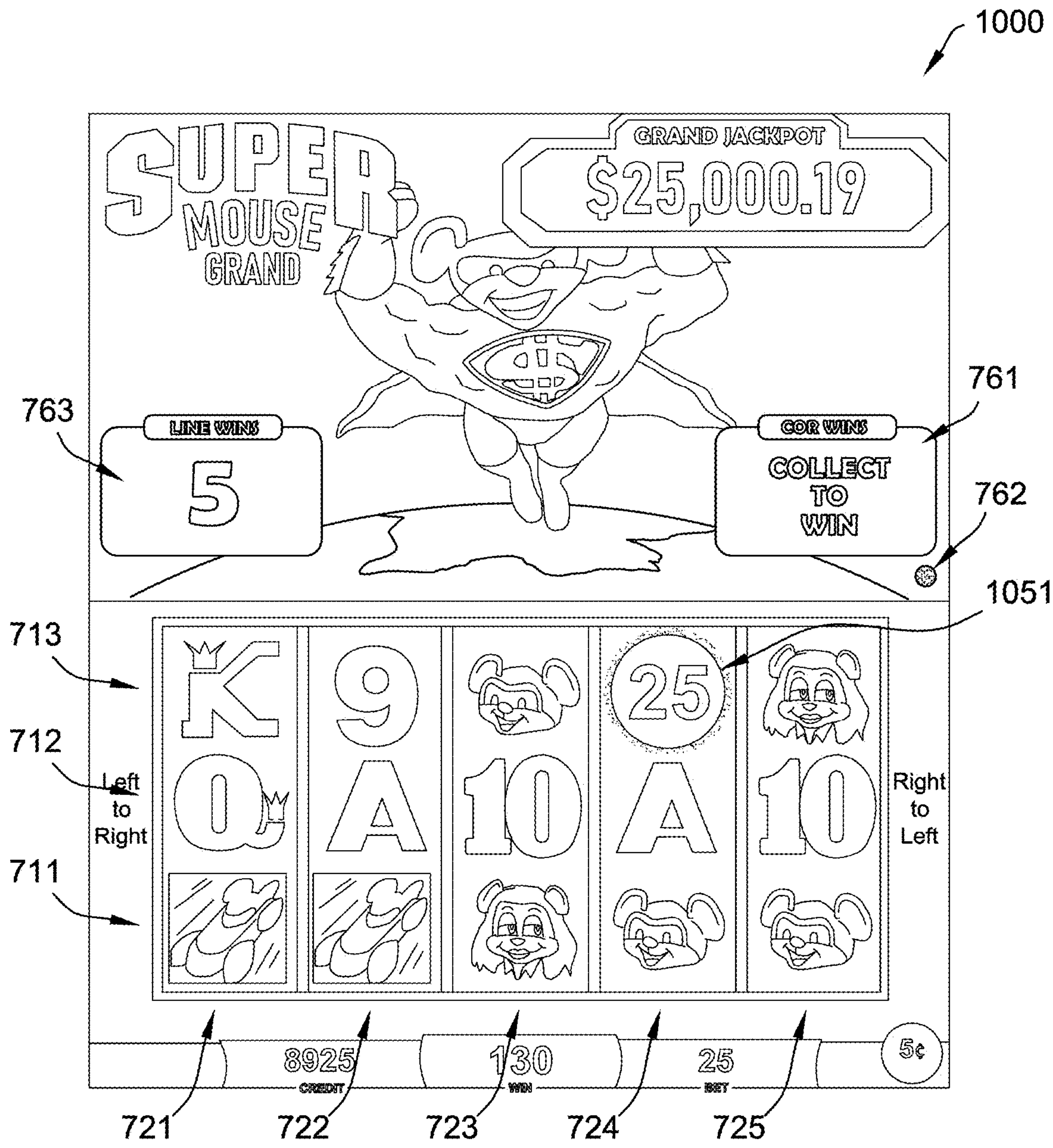

FIG. 10 is an example screen display 1000 of a second free game instance where a NIGHT COR symbol 1051 having an award value of 25 credits has been selected and displayed.

As there are no line wins and only one COR symbol, processor 204 will not award at step 600 and will make a negative determination at step 605. At step 615, processor 204 makes a positive determination and at step 610 updates a first symbol meter in memory 208 and on display 762. In this example, the visual representation of first symbol meter 762 comprises miniature NIGHT COR symbols until more than eight NIGHT COR symbols are collected, after which a number is used to show the number of NIGHT COR symbols collected.

After updating the first symbol meter, processor 204 will complete this iteration by making negative determinations at steps 625, 635, 550 and 560 before incrementing the free game counter to three at step 565.

Figure 11:
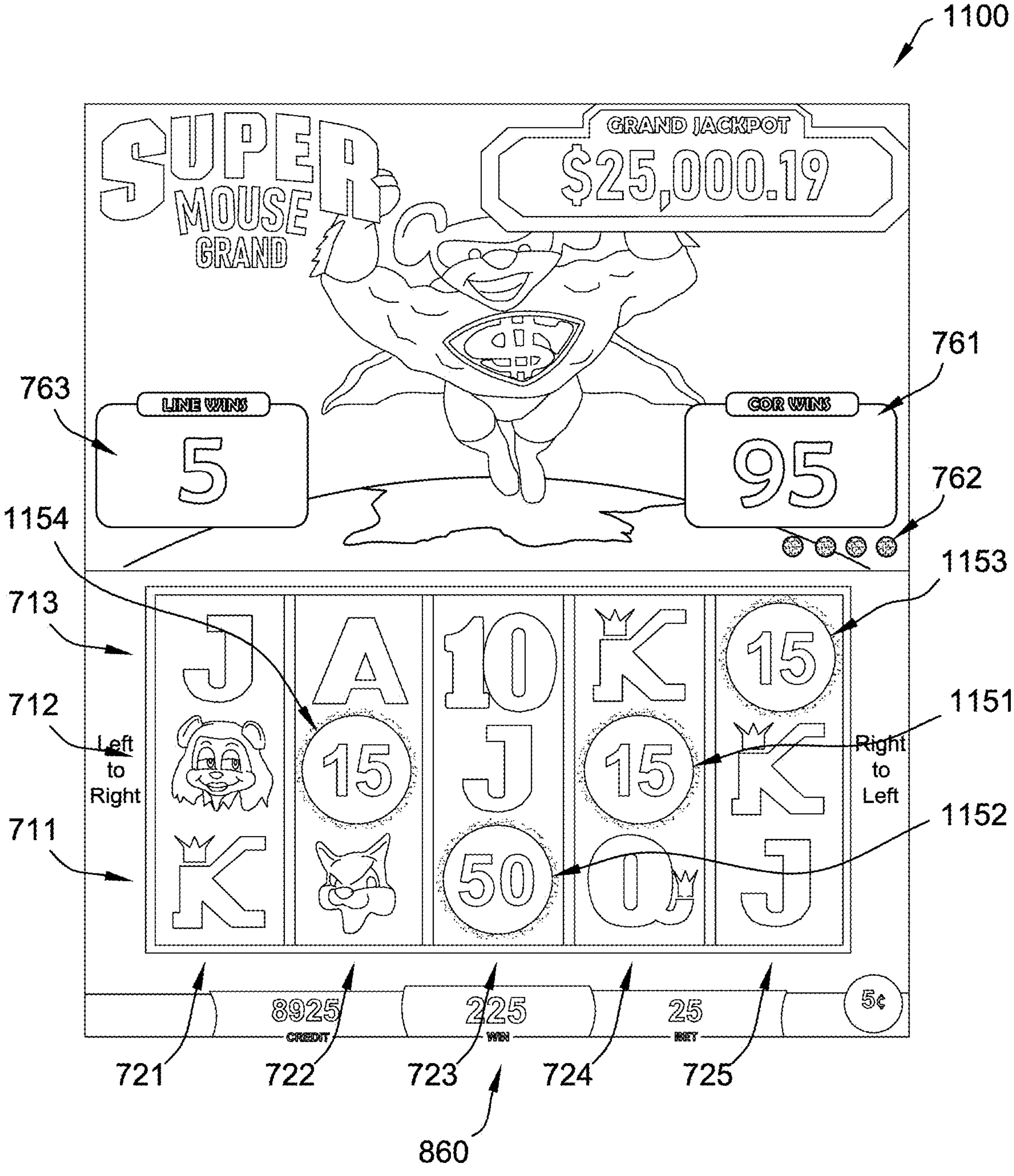

FIG. 11 is an example screen display 1100 of a fifth free game instance. At some point prior to this game instance, first symbol meter 762 has been updated to two. In screen display 1100 the selected symbols include two NIGHT COR symbols 1151,1152 having an award value of 15 credits (NIGHT COR symbol 1151) and 50 credits (NIGHT COR symbol 1152), and two DAY COR symbols 1153,1154 having an award value of 15 credits (DAY COR symbol 1153) and 15 credits (DAY COR symbol 1154).

In the case of screen display 1100, at step 600 processor 204 has evaluated the selected symbols and determined that there is an award of 95 credits for COR symbols (15+50+15+15) and updated win meter 860 to have the value 225 credits. Processor 204 has made a positive determination at step 605 and update COR meter 761 to a value of 95 credits and a further positive determination at step 615 and added two to the first symbol meter 762 so that it now has four miniature NIGHT GLOBE symbols. Processor 204 will then make negative determinations at 625, 635, 550 and 560 before incrementing the free game counter to six at step 565.

As there are no line wins and only one COR symbol, processor 204 will not award at step 600 and will make a negative determination at step 605. At step 615, processor 204 makes a positive determination and at step 610 updates the first symbol meter total meter and on the display screen 762. In this example, the visual representation of first symbol meter 762 comprises miniature NIGHT COR symbols until more than eight NIGHT COR symbols are collected, after which a number is used to show the number of NIGHT COR symbols collected.

After updating the first symbol meter 762, processor 204 will complete this iteration by making negative determinations at steps 625, 635, 550 and 560 before incrementing the free game counter to three at step 565.

Figure 12:
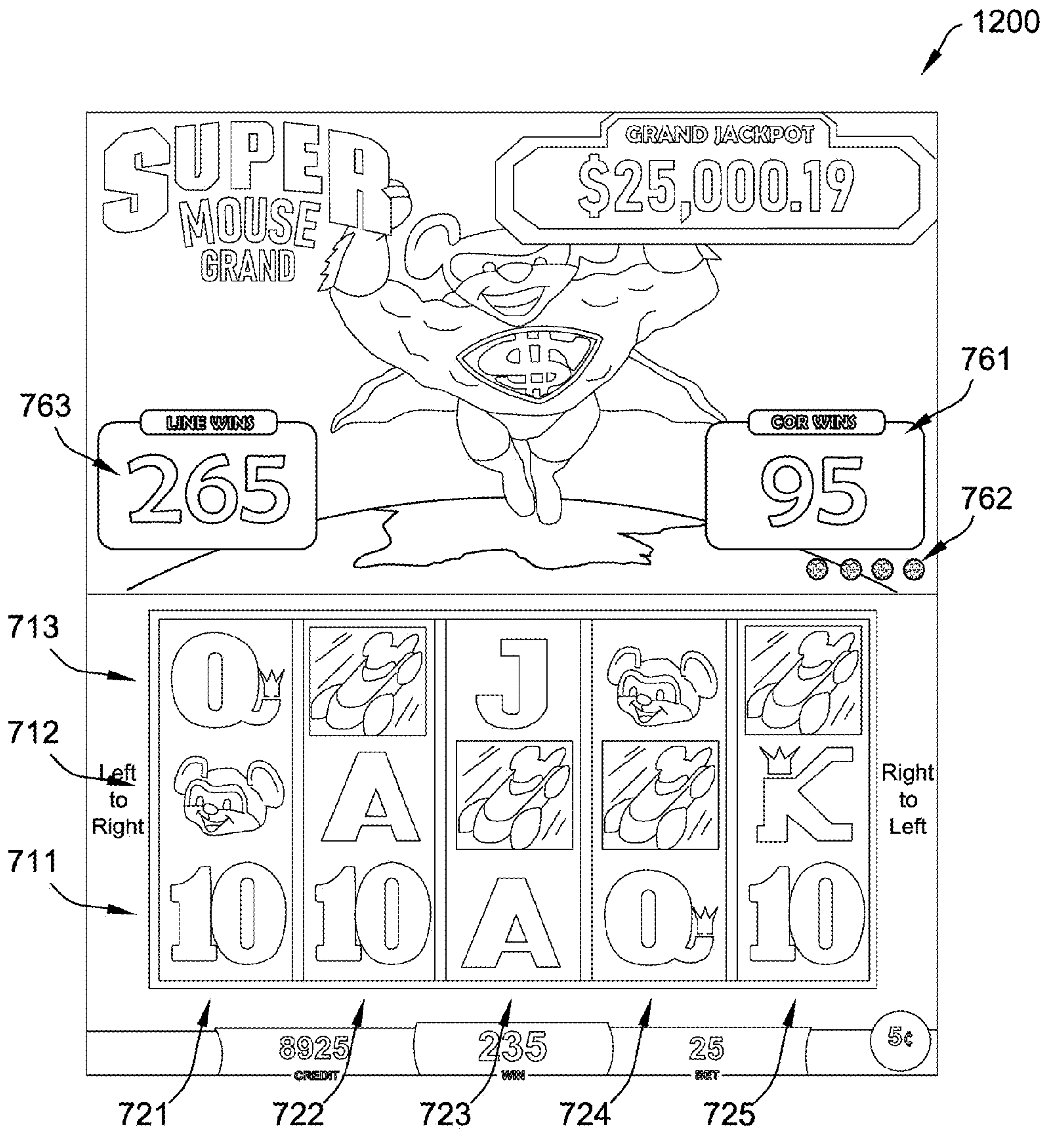
Figure 13:

FIG. 12 shows an example screen display 1200 of a seventh free game instance where a retrigger condition has been met with four SCAT symbols on win line when evaluated from right to left. As explained above, and as shown by game message 1360 in FIG. 13, this results in processor 204 making a positive decision at step 550 and updating the end value at step 555 by incrementing it by "12 Extra Free Games" 1360 such that the end value is now set to twenty.

Figure 14:
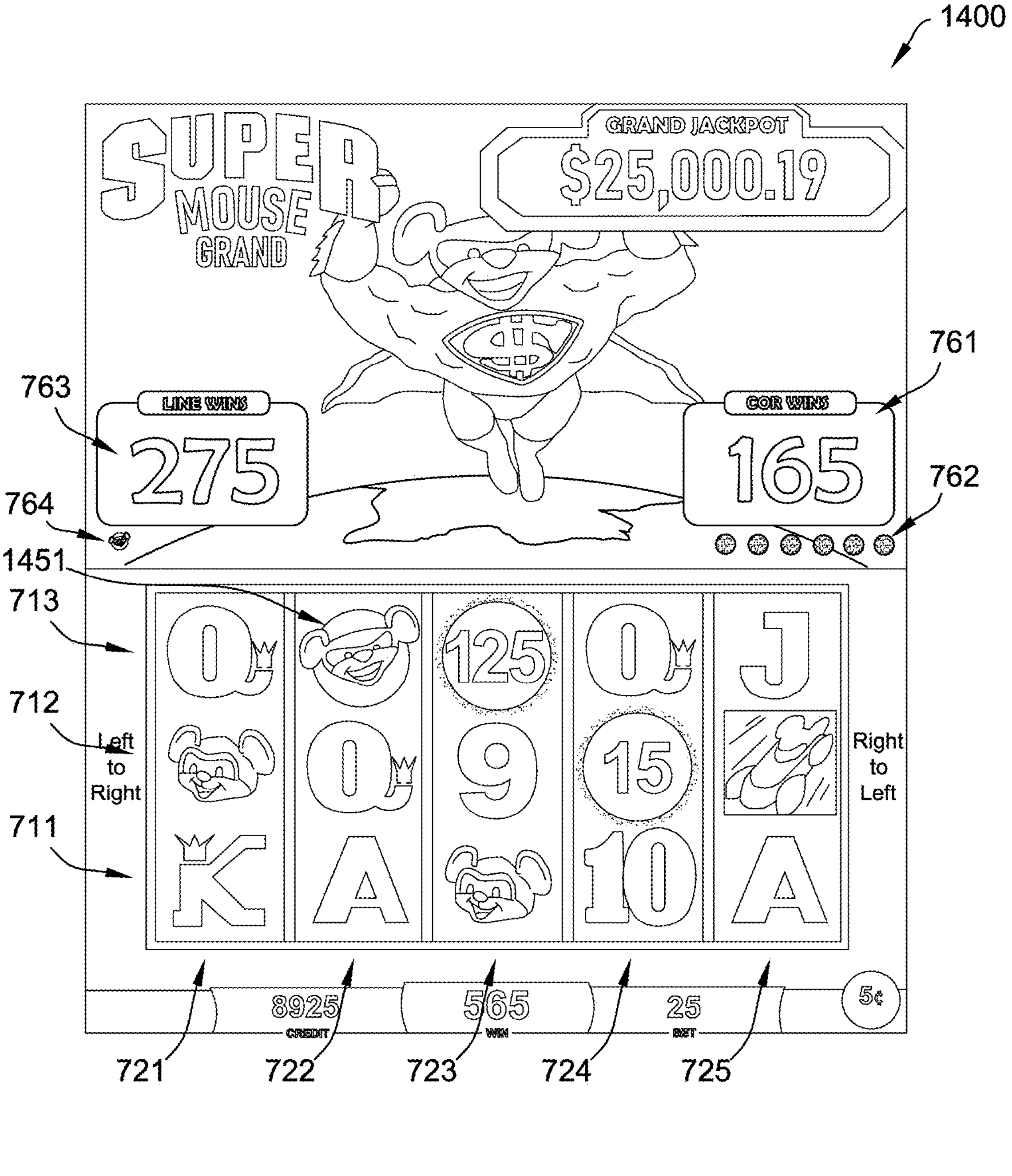

FIG. 14 shows an example screen display 1400 of an eleventh free game instance. In this game instance, the selected symbols include a PIC1 symbol 1451. Accordingly, processor 204 has made a positive determination at step 635 that there is a second repeat symbol and, at step 640, has updated a second symbol meter in memory 208 as well as the visual representation of the second symbol meter 764 on display to show a miniature version of the PIC1 symbol. As with the first symbol meter 762, the second symbol meter 764 is represented by miniature versions of the PIC1 symbol until more than eight PIC1 symbols are collected, after which a number is used to show the number of NIGHT COR symbols collected.

Figure 15:
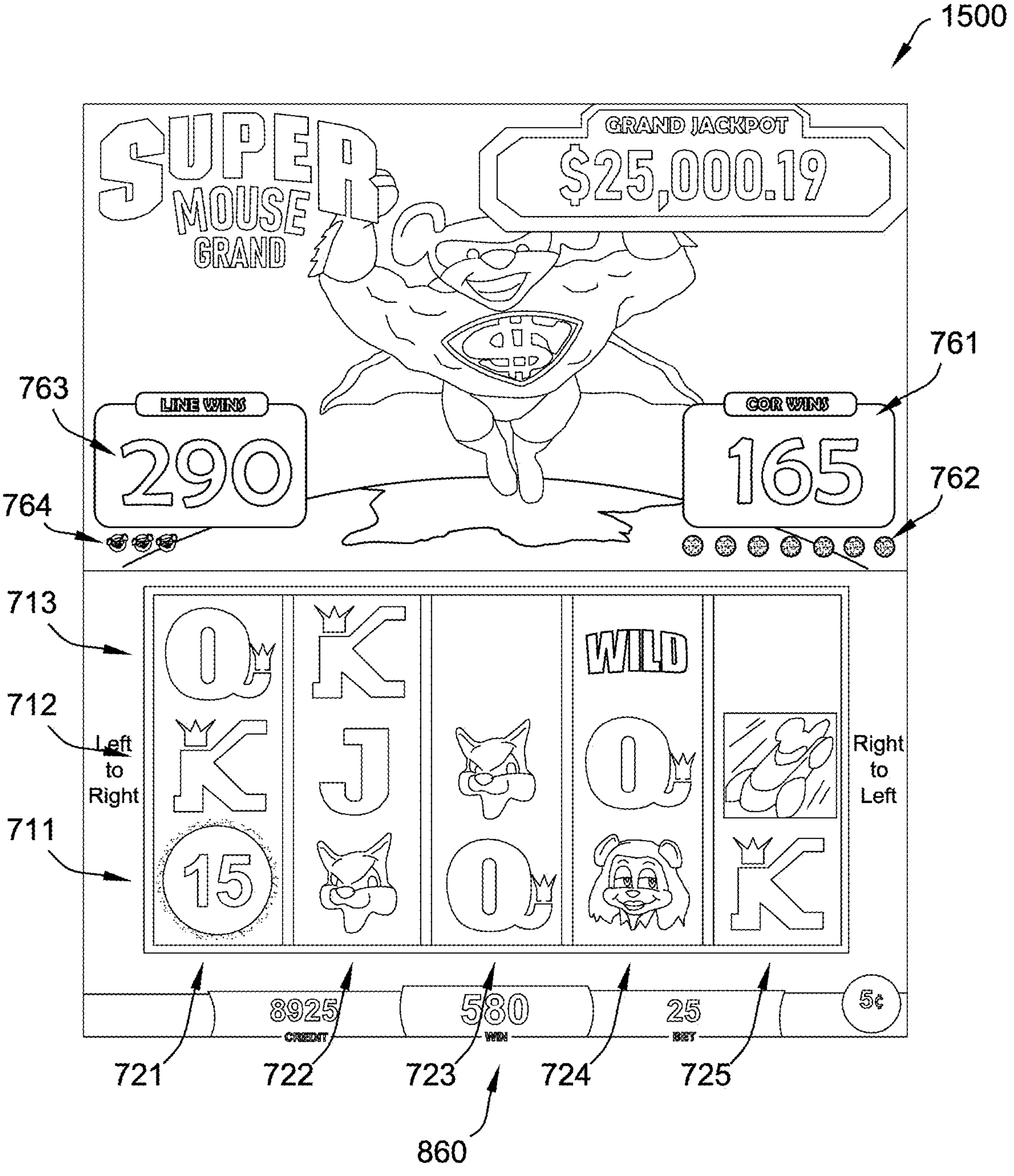

FIG. 15 shows an example screen display 1500 at the end of the free game series. That is, where processor 204 has made a positive determination at step 560 that the counter value equals the end value. It will be observed that the value on the COR wins meter 761 is 165 credits and the value on the line wins meter 763 is 290 credits. It will be observed that at this time point, the value on win meter 860 is 580 credits, reflecting the addition of 165+290 credits to the initial value of 125 credits from the triggering base game.

It will also be observed that the value of the first repeat symbol meter (the NIGHT COR meter) is seven and the value of the second repeat symbol meter (the PIC1 meter) is three. At step, 570 processor makes an award base on the final totals of both categories of award meter and the corresponding repeat win symbol meters. In this example, as described above, awards of line wins and COR wins have been made as they occur in individual free game instances, and at step 570 processor 204 makes the award by repeating the amount awarded during the free game instances by the number of first and second symbols collected during the free game instances.

In this example, the processor 204 repeats the COR wins seven times for the seven NIGHT COR symbols collected. In this example, awarding 7×165 credits=1155 credits in addition to the 165 credits awarded during the free game instances so that a total of 1320 credits is awarded from the COR win aspect of the free game instances.

Similarly, the processor 204 repeats the line wins three times for the three PIC1 symbols collected. In this example, awarding 3×290 credits=870 credits in addition to the 290 credits previously awarded during the free game instances so that a total of 1160 credits is awarded from the line win aspect of the free game instances. That is, at the end of the free game instances, processor 204 makes an additional award of ((COR meter value×first symbol value)+(Line Win meter value)*second symbol value)). The total amount awarded from the free games is ((COR meter value×(1+first symbol value))+ (Line Win meter value)*(1+second symbol value))).

Figure 16:
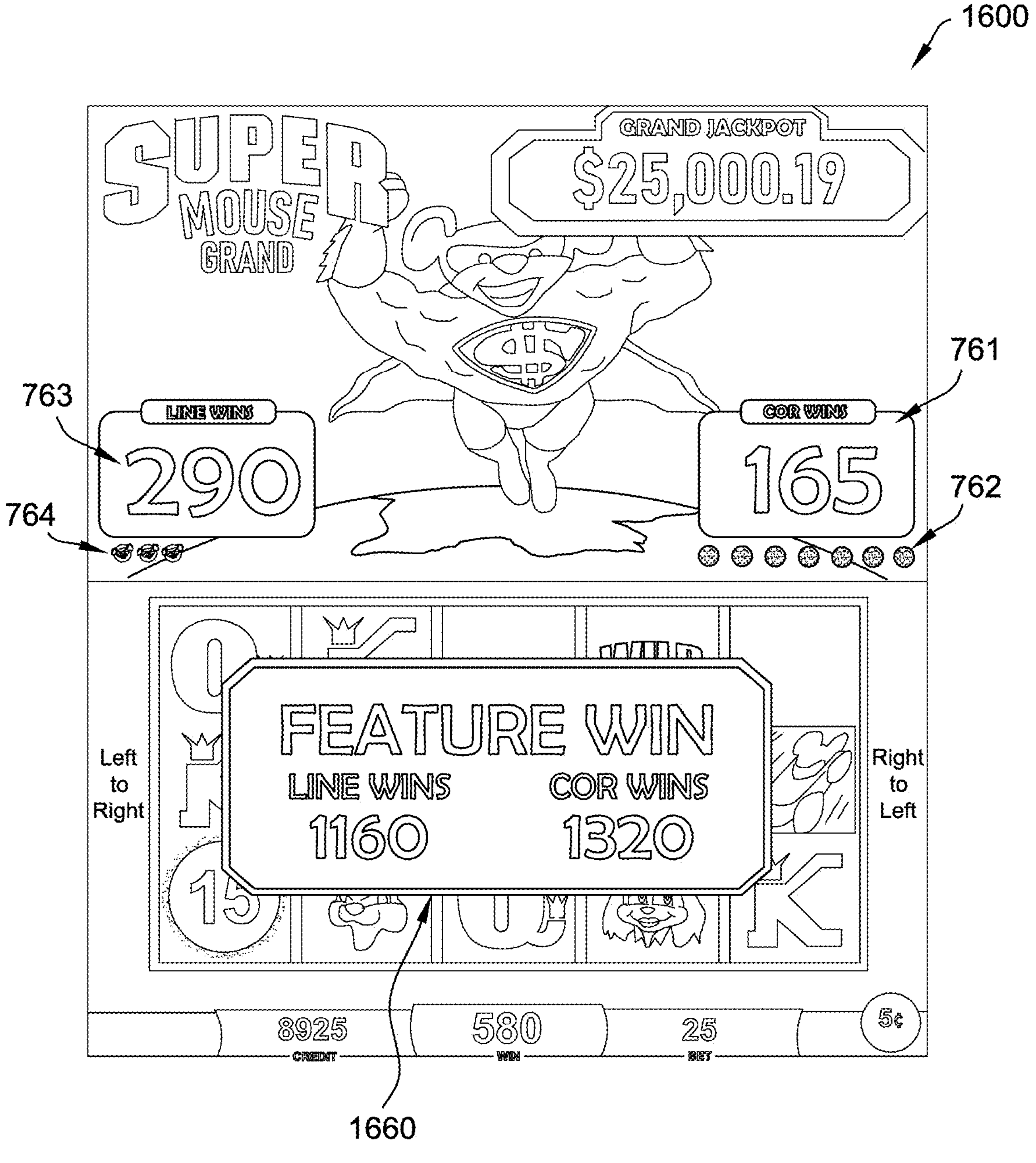
Figure 17:
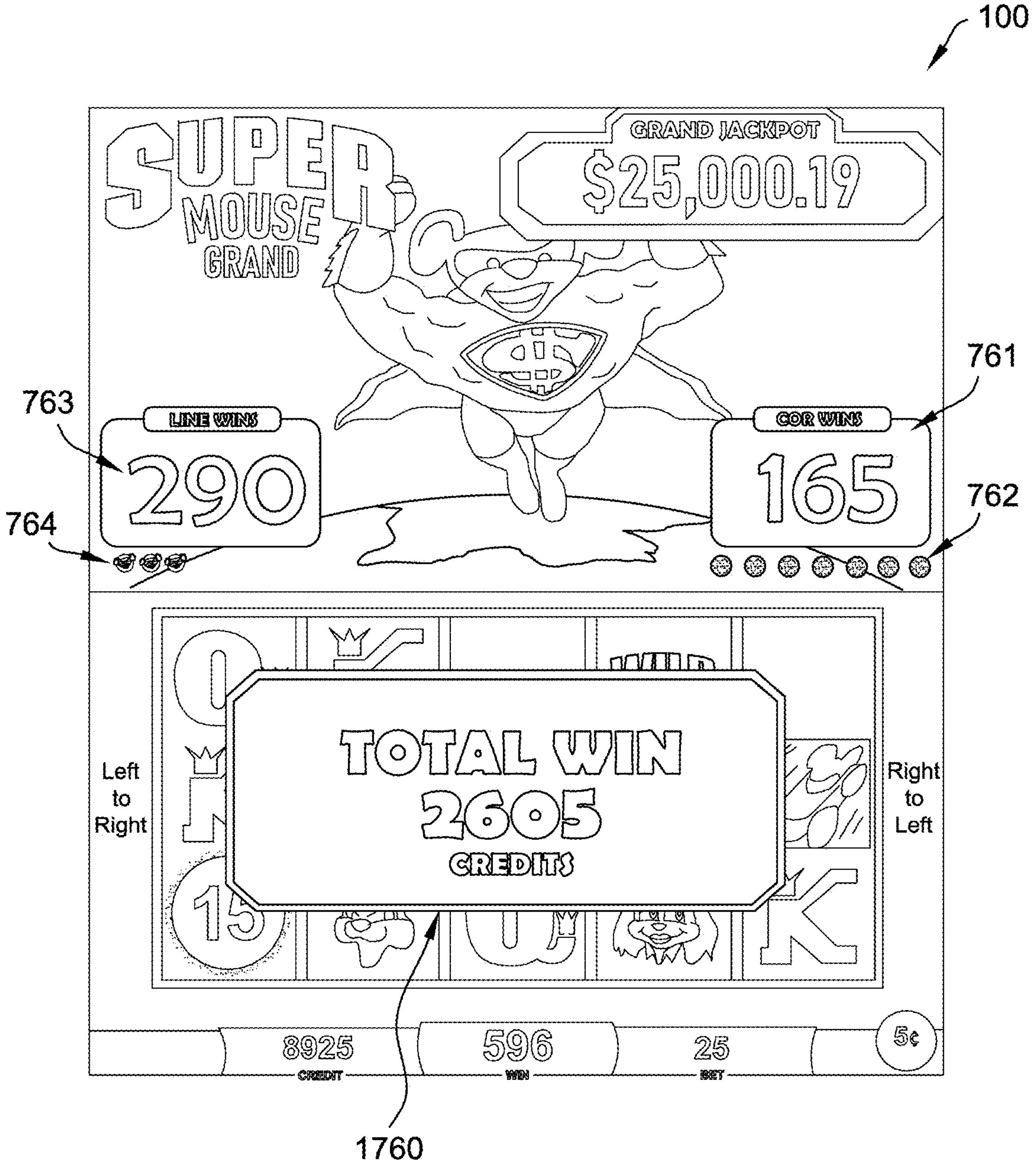

FIG. 16 is an example of a screen display 1600 where processor 204 has controlled display 204 to show award message "Feature Win. Line Wins 1160. COR Wins 1320" corresponding to the total amount awarded from the free games.

Processor 204 then controls the display 240 to display a total win message "Total Win. 2605 Credits" reflecting the amount won during the current play of the game. That is, the amount won in the free games of 2480 credits plus the amount won in the base game of 125 credits.

It will be apparent from the above description, that example embodiments have meters that maintain total of awards for two different categories of awards (COR wins and Line wins) and two different award modifiers are generated by determining totals of symbols collected over the game instances. In other example embodiments, one or more additional categories of awards may be evaluated. For example, awards for specific symbols of the set of symbols. In such embodiments, further award modifiers may be derived from the selected symbols.

In the above examples, the COR award meter 761 and the Line Wins award meter 763 are modified by the totals of the collected symbols on the symbol meters 762,764 by being multiplied by them. In other examples, the values on the award meters may be modified in a different manner, e.g., two times, or ten times the number shown on the collected symbols.

Figure 18:
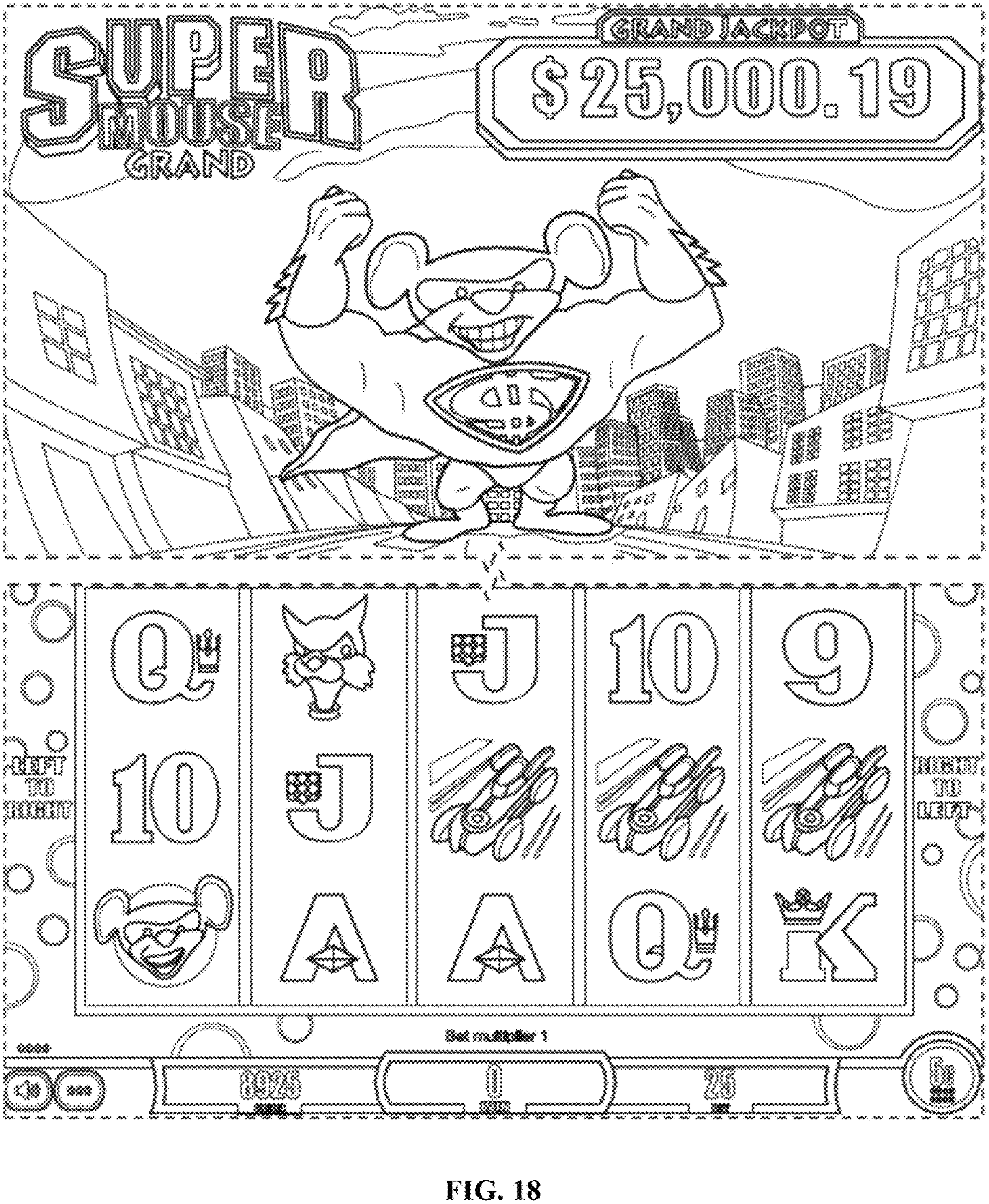
Figure 19:
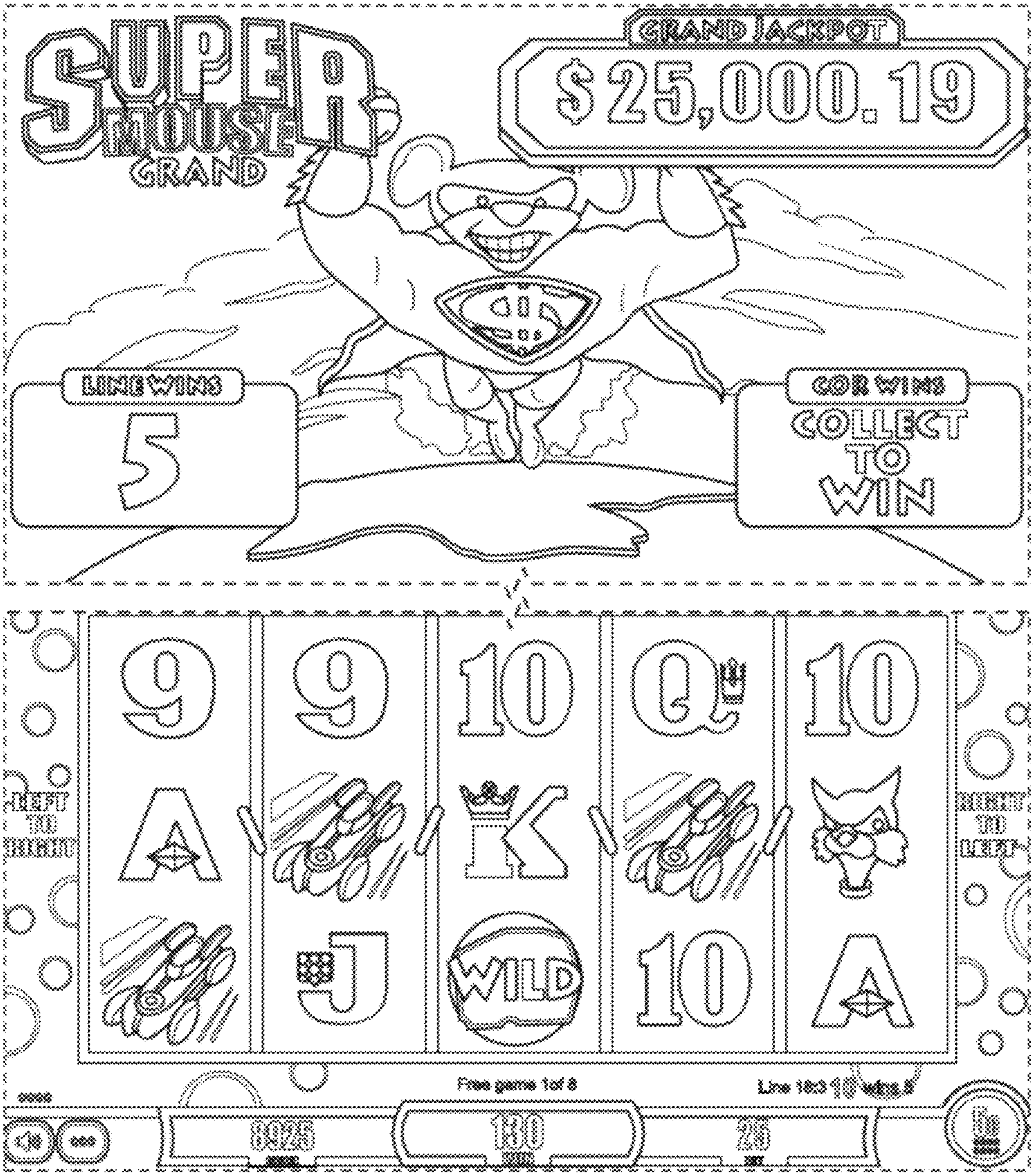
Figure 20:
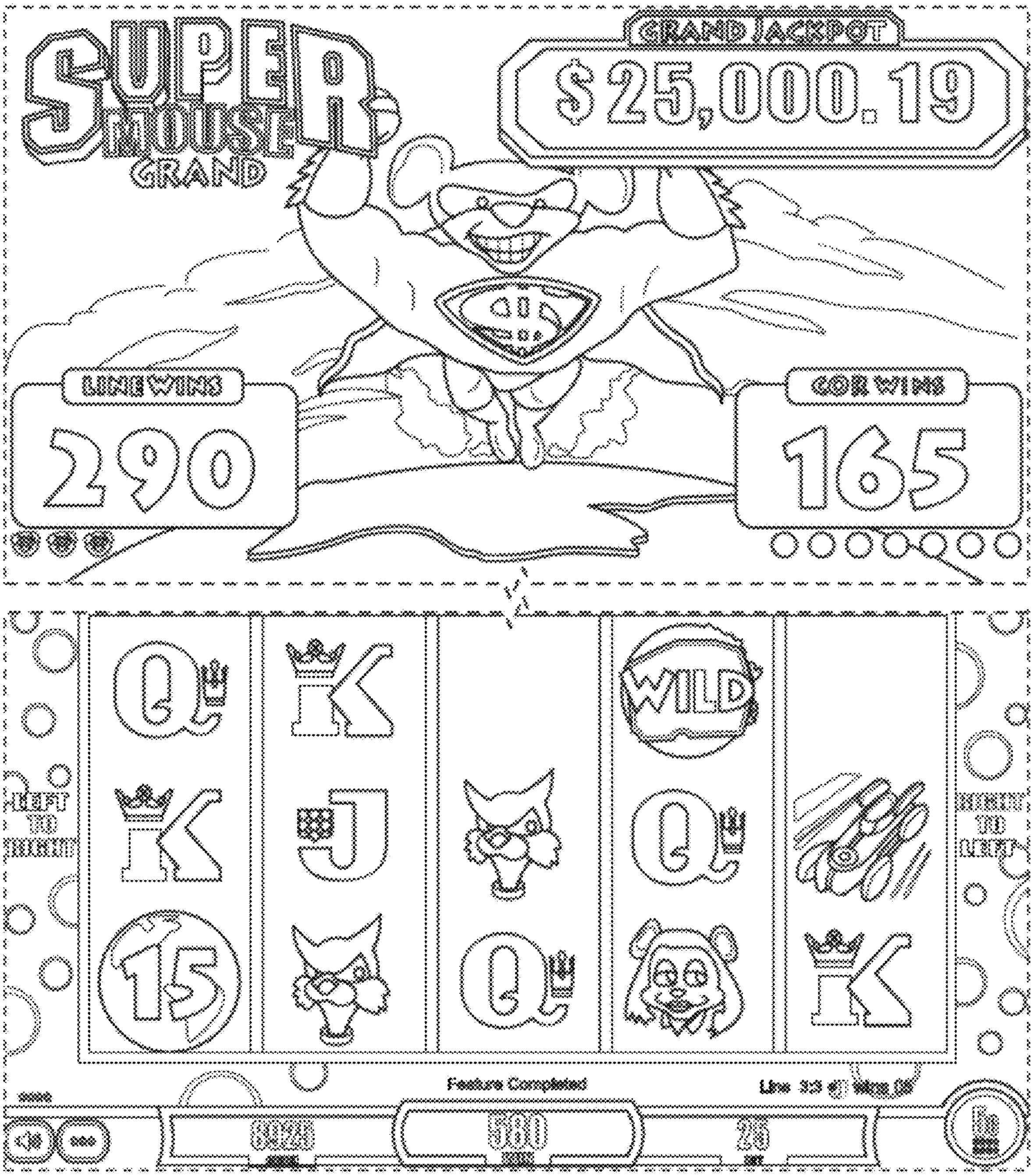

FIGS. 18 to 20 are additional example screen displays of an example game including the functionality described herein. FIGS. 18 to 20 may be similar to example screen displays shown here using FIGS. 7-17 in functionality while having different images or animation being displayed on the display screen of the gaming device during the game play.

The invention may also be said broadly to consist in the parts, elements and features referred to or indicated in the specification of the application, individually or collectively, in any or all combinations of two or more of said parts, elements or features.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

What is claimed is:

1. A gaming device, comprising:

at least one processor; and at least one memory storing reel data defining a plurality of reel strips and instructions which, when executed by the at least one processor, cause the at least one processor to:

cause display of symbols in a plurality of columns of symbol positions, wherein the displayed symbols are selected from a portion of the plurality of reel strips and include value symbols, wherein each symbol is assigned a symbol position in the plurality of columns of symbol positions using a random number generator (RNG)-based lookup operation in a lookup table;

store at least one winning symbol combination in the at least one memory;

based upon the symbols selected for display in the plurality of columns of symbol positions, for at least a first category of awards and a second category of awards:

determine that the symbols selected for display include at least one winning symbol combination of at least one of the first category award or the second category award;

add any first category awards to a first category total in the memory, and any second category awards to a second category total in the memory;

upon the displayed symbols including one or more first category symbols, add a number of the one or more first category symbols to a first category symbol total in the memory;

upon the displayed symbols including one or more second category symbols, add a number of the one or more second category symbols to a second category symbol total in the memory; and cause display of the number of the one or more first category symbols associated with the first category total, and the number of the one or more second category symbols associated with the second category total; and upon conclusion of all feature game instances, output an award based on (i) a combination of the first category total and the first category symbol total, and (ii) a combination of the second category total and the second category symbol total, thereby generating an increased number of various output awards for the feature game instances while reducing data stored for determining the at least one winning symbol combination of at least one of the first category awards and the second category awards.

2. The gaming device of claim 1, wherein when the instructions are executed by the processor, they cause the at least one processor to conduct the feature game instances in response to a trigger condition being met in a base game.

3. The gaming device of claim 1, wherein the first category total is modified based on the first category symbol total by being multiplied by the first category symbol total, and the second category total is modified based on the second category symbol total by being multiplied by the second category symbol total.

4. The gaming device of claim 1, wherein when the instructions are executed by the processor, they cause the at least one processor to determine conclusion of all feature game instances by comparing a number of conducted feature game instances to a total number of feature game instances to be conducted.

5. The gaming device of claim 4, wherein when the instructions are executed by the processor, they cause the at least one processor to increment the total number of feature game instances in response to selection of symbols for displaying in the plurality of columns of symbol positions satisfying an increment condition.

6. The gaming device of claim 1, wherein the first category of award is an award of a total of prize values on respective ones of a plurality of prize symbols including cash on reel (COR) symbols.

7. The gaming device of claim 1, wherein the second category of award is an award of line wins.

8. A computer-implemented method of operating a gaming device, the computer-implemented method comprising:

causing display of symbols in a plurality of columns of symbol positions, wherein the displayed symbols are selected from a portion of a plurality of reel strips and include value symbols, wherein each symbol is assigned a symbol position in the plurality of columns of symbol positions using a random number generator (RNG)-based lookup operation in a lookup table;

storing at least one winning symbol combination in the at least one memory;

based upon the symbols selected for display in the plurality of columns of symbol positions, for at least a first category of awards and a second category of awards:

determining that the symbols selected for display include at least one winning symbol combination of at least one of the first category award or the second category award;

adding any first category awards to a first category total in the memory, and any second category awards to a second category total in the memory;

upon the displayed symbols including one or more first category symbols, adding a number of the one or more first category symbols to a first category symbol total in the memory;

upon the displayed symbols including one or more second category symbols, adding a number of the one or more second category symbols to a second category symbol total in the memory; and causing display of the number of the one or more first category symbols associated with the first category total, and the number of the one or more second category symbols associated with the second category total; and upon conclusion of all feature game instances, outputting an award based on a combination of (i) the first category total and the first category symbol total, and (ii) a combination of the second category total and the second category symbol total, thereby generating an increased number of various output awards for the feature game instances while reducing data stored for determining the at least one winning symbol combination of at least one of the first category awards and the second category awards.

9. The computer-implemented method of claim 8, further comprising conducting the feature game instances in response to a trigger condition being met in a base game.

10. The computer-implemented method of claim 8, wherein the first category total is modified based on the first category symbol total by being multiplied by the first category symbol total, and the second category total is modified based on the second category symbol total by being multiplied by the second category symbol total.

11. The computer-implemented method of claim 8, further comprising determining conclusion of all feature game instances by comparing a number of conducted feature game instances to a total number of feature game instances to be conducted.

12. The computer-implemented method of claim 11, further comprising incrementing the total number of feature game instances in response to selection of symbols for displaying in the plurality of columns of symbol positions satisfying an increment condition.

13. The computer-implemented method of claim 8, wherein the first category of award is an award of a total of prize values on respective ones of a plurality of prize symbols including cash on reel (COR) symbols.

14. The computer-implemented method of claim 8, wherein the second category of award is an award of line wins.

15. A system comprising:

one or more processors; and one or more memory storing reel data defining a plurality of reel strips and instructions, wherein the instructions stored in the one or more memory, when executed by the one or more processors, cause the one or more processors to:

cause display of symbols in a plurality of columns of symbol positions during a current feature game instance, wherein the displayed symbols are selected from a portion of a plurality of reel strips and include value symbols, wherein each symbol is assigned a symbol position in the plurality of columns of symbol positions using a random number generator (RNG)-based lookup operation in a lookup table;

storing at least one winning symbol combination in the at least one memory; and based upon the symbols selected for display in the plurality of columns of symbol positions during the current feature game instance, for at least a first category of awards and a second category of awards:

determine that the symbols selected for display include at least one winning symbol combination of at least one of the first category award or the second category award;

add any first category awards to a first category total in the memory, and any second category awards to a second category total in the memory;

upon the displayed symbols including one or more first category symbols, add a number of the one or more first category symbols to a first category symbol total in the memory;

upon the displayed symbols including one or more second category symbols, add a number of the one or more second category symbols to a second category symbol total in the memory; and update a display of the number of the one or more first category symbols associated with the first category total, and the number of the one or more second category symbols associated with the second category total for a next feature game instance; and upon conclusion of all feature game instances, output an award based on (i) a combination of the first category total and the first category symbol total, and (ii) a combination of the second category total and the second category symbol total, thereby generating an increased number of various output awards for the feature game instances while reducing data stored for determining the at least one winning symbol combination of at least one of the first category awards and the second category awards.

16. The system of claim 15, wherein the first category total is modified based on the first category symbol total by being multiplied by the first category symbol total, and the second category total is modified based on the second category symbol total by being multiplied by the second category symbol total.

17. The system of claim 15, wherein when the instructions are executed by the one or more processors, they cause the one or more processors to determine conclusion of all feature game instances by comparing a number of conducted feature game instances to a total number of feature game instances to be conducted.

18. The system of claim 17, wherein when the instructions are executed by the one or more processors, they cause the one or more processors to increment the total number of feature game instances in response to selection of symbols for displaying in the plurality of columns of symbol positions satisfying an increment condition.

19. The system of claim 15, wherein the second category of award is an award of line wins.

* * * * *